NON-MATRIXING BLANKING CIRCUIT

Filed June 15, 1967

INVENTORS.
James G. S. Chua
Bernard J. Okey
BY Nicholas A. Camasto
ATTY.

3,519,735
NON-MATRIXING BLANKING CIRCUIT

James G. S. Chua, Roselle, and Bernard J. Okey, Elmwood Park, Ill., assignors to Admiral Corporation, Chicago, Ill., a corporation of Delaware Filed June 15, 1967, Ser. No. 646,387
Int. Cl. H04n *9/18, 9/52*
U.S. Cl. 178—5.4 5 Claims

ABSTRACT OF THE DISCLOSURE

A common transistor blanking and key clamping circuit for separate color difference amplifiers having a common load impedance. A transistor has its output electrode directly connected to the common load impedance, its common electrode connected to a low voltage source, and its input electrode coupled to a source of line frequency retrace pulses. During trace, the transistor is in saturation thus presenting a low impedance across its output terminals and the common load impedance. The retrace pulse cuts off the transistor, thereby applying a negative pulse to the color difference amplifiers.

The chrominance channel of a color television receiver generally includes one or more bandpass amplifier stages for amplifying the separated chrominance signal, a chroma demodulator for converting the chrominance signal into two demodulated signals, each containing color difference information, and matrixing circuitry for developing the required three color difference signals. Color difference signal amplifiers may also be included, depending upon the type of chroma demodulator employed. Basically, there are two different types of chroma demodulators, high level and low level. High level demodulators provide sufficient gain to preclude the need for further amplification of the color difference signals. Low level demodulators require further amplification of the color difference signals before application to the picture tube.

In present low level demodulator practice, matrixing is closely associated with the color difference amplifiers with the matrix being proportioned to produce the $R-Y$, $B-Y$ and $G-Y$ signals from two demodulated signals A and B. The color difference amplifiers usually comprise triode electron tubes and may comprise transistors. If external matrixing alone is used, the A and B signals may be the $R-Y$ and $B-Y$ signals, respectively. These two signals are coupled to the control electrodes of the respective $R-Y$ and $B-Y$ amplifier tubes so that an amplified version of the $R-Y$ and $B-Y$ signals appears on the anodes of these tubes. A resistive network of the proper resistance ratio couples the anodes of the $R-Y$ and $B-Y$ tubes to the control electrode of the $G-Y$ tube. It is well-known that algebraic addition of $R-Y$ and $B-Y$ signals of the proper ratio produces the required $G-Y$ signal. Thus, the combined $R-Y$ and $B-Y$ signals on the control electrode of the $G-Y$ tube produce an amplified $G-Y$ signal on the anode of this tube.

If cathode or internal matrixing is employed, the A and B signals will not be true $R-Y$ and $B-Y$ but will each contain both $R-Y$ and $B-Y$ information in differing proportions. The respective cathodes of the three color difference amplifiers are directly connected to a common terminal which in turn is connected through a common load resistor to a source of ground reference potential. With this arrangement, the A and B signals present on the control grids and cathodes of the $R-Y$ and $B-Y$ tubes are added in the common cathode resistor. This combined signal is present at the cathode circuit of the $G-Y$ tube. Since the ratio of $R-Y$ and $B-Y$ signals required to produce the $G-Y$ signal cannot be obtained solely through matrixing in a common cathode resistor, a certain amount of additional $R-Y$ signal must be fed to the control grid of the $G-Y$ tube from the anode of the $R-Y$ tube. These techniques are well-known in the art.

With color difference amplifying circuitry embodying cathode matrixing, it is also known to provide a combination function of "horizontal retrace blanking" and "key clamping" during the horizontal retrace period. It will be appreciated that, by providing a sufficiently large negative pulse on the common cathodes of the color difference tubes, an amplified version of that negative pulse will appear on each of the anodes of the tubes. These large negative pulses may be capacitively coupled to the control electrodes of the color picture tube to provide effective blanking therein. At the same time, the negative pulse supplied to the common cathode terminal may be used to reset the level of the DC voltage on the control grids of the color difference tubes to the proper value during each horizontal retrace period. As will be discussed below, this operation of "key clamping" the color difference tubes is very important. It cannot readily be obtained without encountering cathode matrixing (or resorting to complicated grid pulsing techniques) since a common impedance is essential to develop the pulse voltage. Further, in other systems of color transmission, notably in the PAL system (phase alternating line), it is essential to demodulate for $R-Y$ directly which precludes a cathode matrix system. What the invention discloses is a circuit for obtaining key clamping of the color difference amplifiers (and blanking of the picture tube) while avoiding cathode matrixing and complex grid pulsing techniques.

It is therefore the object of this invention to provide an improved color television circuit for accomplishing the functions of horizontal retrace blanking of a color television picture tube and key clamping in a plurality of color difference amplifiers without cathode matrixing.

More particularly, it is the object of this invention to provide a transistor blanking circuit for developing a nearly ideal horizontal retrace blanking and key clamping pulse on the common cathode terminal of a plurality of color difference amplifiers while normally maintaining a near zero impedance for signals at this point.

In accordance with the embodiment of the invention selected for purposes of illustration, a transistor is provided having its output electrode directly connected to the common cathode terminal of a plurality of color difference amplifiers, its common electrode directly connected to a low impedance source of positive DC potential and its input electrode coupled to a trigger pulse source which may comprise a winding on the horizontal output transformer of the color television receiver. The transistor is normally maintained in a saturated state and the trigger pulse applied to its input electrode during retrace is of sufficient magnitude to drive the transistor into cutoff so that a negative pulse is developed on the common cathode terminal of the color difference amplifiers. During normal signal intervals, the common cathode terminal is at a potential of approximately 10 volts due to saturation of the transistor and consequent impression of the 10 volt source voltage therethrough. As the trigger pulse turns off the transistor, the voltage on the common cathode terminal drops rapidly to near ground since the 10 volt source is effectively disconnected by the high impedance of the transistor when in cutoff. When the trigger pulse disappears, the transistor is quickly driven back into saturation, causing the voltage on the common terminal to immediately rise to its normal level. Consequently, a sharp, square negative pulse is developed on the common cathode terminal during retrace. This pulse provides a nearly ideal condition for purposes of blanking and key clamping.

With the improved color television circuit of this invention, therefore, an inexpensive, nearly idealized transistor blanking and key clamping circuit is provided without cathode matrixing. Other objects, features, and advantages of this invention will become apparent from a consideration of the following description in conjunction with the accompanying drawing in which.

Figure 1:
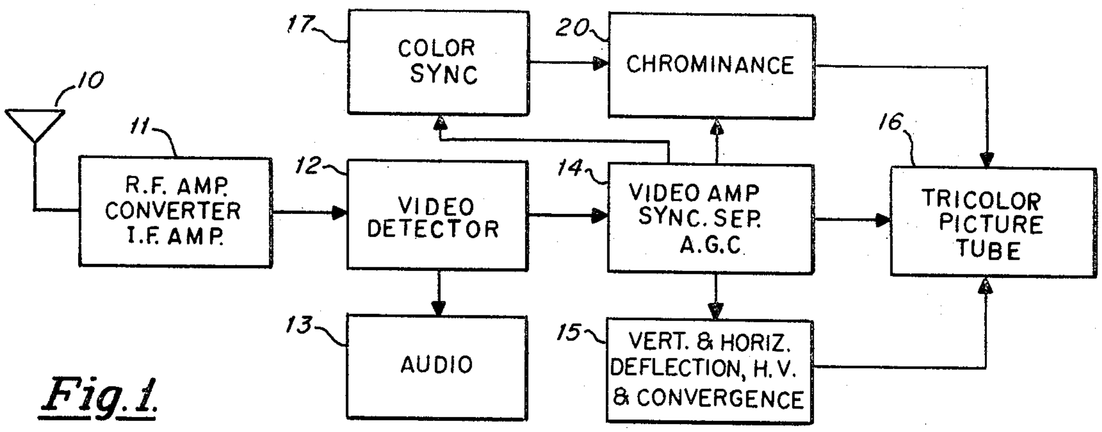
FIG. 1 is a simplified block diagram of a color television receiver.

Referring now to FIG. 1, an antenna 10 receives transmitted television signals and couples them to block 11 which may contain a RF amplifier, a converter, and an IF amplifier. The RF amplifier selectively amplifies one of the received television signals, the converter changes this RF signal to a fixed frequency IF signal, and the IF amplifier amplifies the converted IF signal. The amplified IF signal is then coupled into block 12 labeled video detector. Video detector 12 demodulates the IF signal into a composite signal containing monochrome synchronizing and video information portions as well as color information and synchronizing portions. Block 12 may also contain an audio detector in accordance with common practice. The audio information is coupled to block 13 which may contain conventional audio circuits for reproducing the sound portion of the televised program.

The monochrome video information portion and synchronizing signal portion of the composite signal are coupled to block 14 which may contain a video amplifier, a sync separator, and AGC circuitry. The sync separator circuitry in block 14 separates the synchonirzing signal portion from the composite signal and couples it to block 15 which may contain vertical and horizontal deflection circuitry, high voltage circuitry, and dynamic convergence circuitry. These various circuits in block 15 are coupled to block 16 which may comprise a tricolor picture tube and its associated deflection coils and convergence equipment.

The AGC circuitry within block 14 functions to detect the level of the synchronizing signal portion and to develop a DC control voltage for varying the gain of the RF amplifier and IF amplifier in accordance therewith.

Also within block 14 the luminance information (monochrome video) is separated from the chrominance information, and separately amplified by one or more video amplifier stages and then coupled to tricolor picture tube 16. The chrominance information consists of modulated coded color information and a color burst synchronizing signal for regenerating the suppressed color subcarrier. Block 14 also contains color burst separator circuitry which separates the burst and couples it to color sync circuit 17. The modulated coded color information from block 14 is then coupled into block 20 which may contain the chrominance circuitry, including a chroma bandpass amplifier, a chroma demodulator, and various related circuitry. The chrominance circuitry in block 20 functions under the control of color sync circuitry in block 17. The color sync circuitry 17 and chrominance circuitry 20 serve to amplify and demodulate the chroma signal, which is then applied in an appropriate manner to tricolor picture tube 16. The preceding description is considerably simplified since the details of the operation of color television receivers are well-known.

Figure 2:
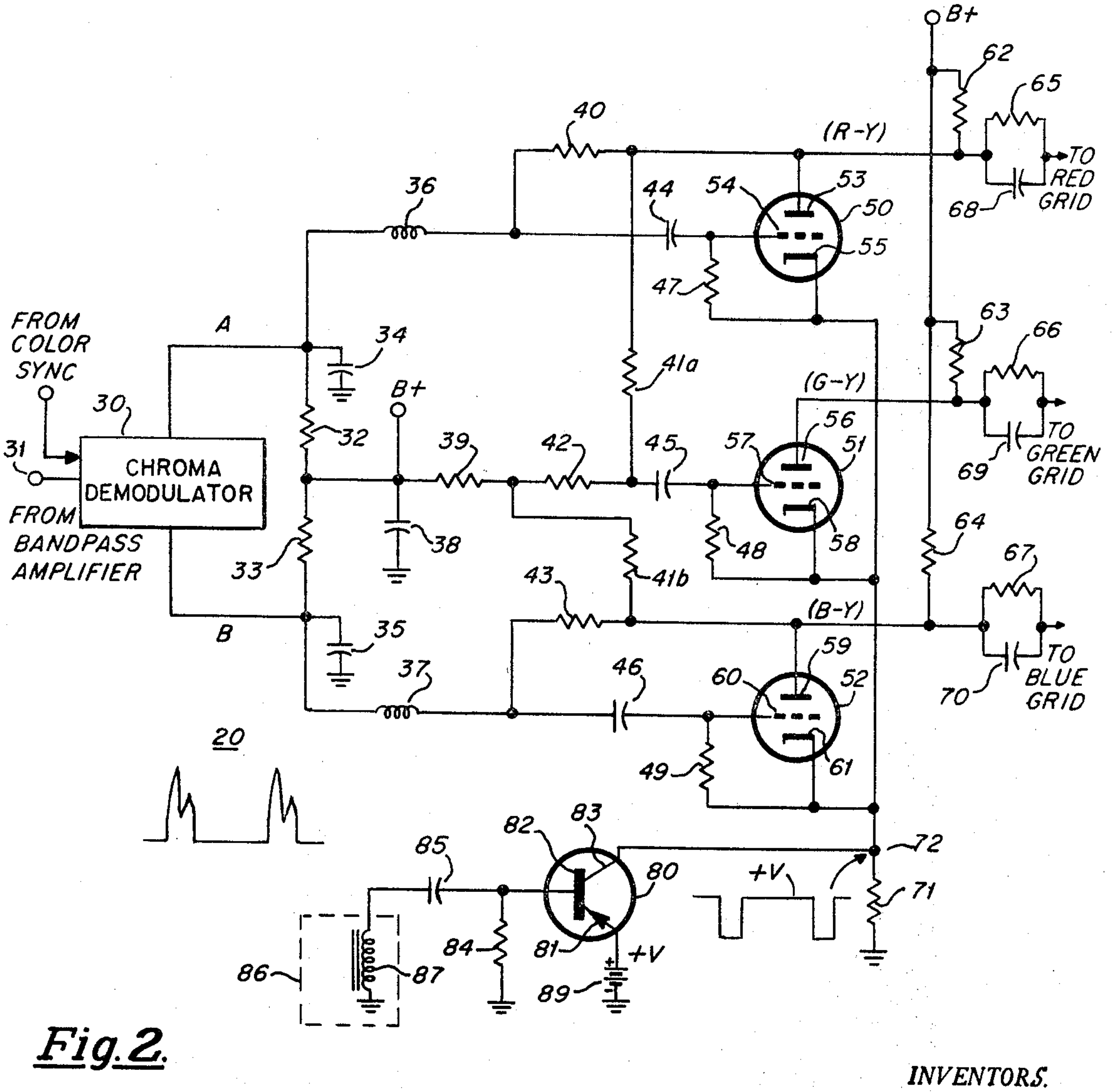
FIG. 2 is a schematic diagram of a portion of the color television receiver of FIG. 1 including circuitry embodying this invention.

In FIG. 2 an example of a portion of the circuitry contained in block 20 in FIG. 1 is shown, in conjunction with the preferred embodiment of the circuit of this invention. As shown in FIG. 2, the chrominance circuitry 20 includes a croma demodulator 30 which has an input terminal 31 receiving the amplified chroma signal from the preceding chroma bandpass amplifier (not shown). Another input to the demodulator comes from color sync circuit 17. This input actually contains two phase displaced reference signals (regenerated under the control of the color burst signal) necessary to demodulate the coded color difference signals. Chroma demodulator 30 has two outputs labeled A and B. Resistors 32 and 33 couple the A and B leads respectively to a source of B+ potential. Capacitors 34 and 35 couple these same two leads to a source of ground reference potential, and capacitor 38 couples the junction point of resistors 32 and 33 to a source of ground reference potential. Inductor 36 and capacitor 44 are connected in series between the A lead and control electrode 54 of electron tube 50. Similarly, inductor 37 and capacitor 46 are connected in series between the B lead and control electrode 60 of electron tube 52. B+ is also connected, through a series connection of resistors 39 and 42 and a capacitor 45, to control electrode 57 of tube 51. Resistors 40 and 43 are connected between anode 53 of tube 50 and anode 59 of tube 52, respectively, and the junctions of inductor 36 and capacitor 44 and inductor 37 and capacitor 46. Resistors 47, 48, and 49 are respectively connected between control electrode 54 and cathode 55 of tube 50, control electrode 57 and cathode 58 of tube 51, and control electrode 60 and cathode 61 of tube 52. Cathodes 55, 58, and 61 are directly connected to common terminal 72, which in turn is connected by way of resistor 71 to a source of ground reference potential. Resistors 62, 63, and 64 connect anodes 53, 56, and 59, respectively, to B+ potential. A resistor **41*a* connects anode 53 to the junction of resistor 42 and capacitor 45. A resistor 41*b* connects anode 59 to the junction of resistors 39 and 42. The respective parallel combinations of resistors 65, 66, and 67 and capacitors 68, 69, and 70 couple anodes 53, 56, and 59** to the respective red, green, and blue grids of the tricolor picture tube (not shown).

A transistor 80, of the PNP type, has an emitter 81, a base 82, and a collector 83. Collector 83 of transistor 80 is directly connected to common terminal 72. Emitter 81 of transistor 80 is directly connected to a low voltage DC source indicated as a battery 89 with a potential +V. Resistor 84 connects base 82 of transistor 80 to a source of ground reference potential, and capacitor 85 couples base 82 to dashed line block 86 which may contain a horizontal output transformer having an inductively coupled winding 87. It will be seen that transistor 80 is properly biased for conduction with its emitter positive with respect to its base, and such is its normal condition. The value of resistor 84 is selected to normally keep transistor 83 in a state of emitter-collector current saturation. Horizontal output transformer 86 will generally be part of the vertical and horizontal deflection circuitry in block 15 of FIG. 1.

Chroma demodulator 30 functions to develop the two signals A and B. These signals are devolped across load resistors 32 and 33, respectively, and are coupled to control elecetrodes 54 and 60 of tubes 50 and 52, respectively. As will be explained shortly, there is no cathode matrixing despite the presence of common load resistor 71. Consequently, the signals A and B are actually the desired color difference signals $R-Y$ and $B-Y$, respectively, and amplified versions of these signals appear on anodes 53 and 59, respectively. Resistor 41 couples a predetermined amount of $R-Y$ signal from the $R-Y$ color difference amplified (anode 53 to control electrode 57 of tube 51) and resistor 42 does the same with respect to the $B-Y$ color difference amplifier. The proportions of $R-Y$ and $B-Y$ are selected to produce the third desired color difference signal $G-Y$ at control electrode 57 and result in tube 51 being a $G-Y$ color difference amplifier. All of the above function are, of course, well-known in the color television art. The three color difference signals appearing on anodes 53, 56, and 59 are coupled to the red, green, and blue grids, respectively, in the tricolor picture tube. This signal information, together with the luminance or Y signal information available on the cathodes of the tricolor picture tube, function to produce the required potential differences between the respective control grids and the cathodes so that a proper color picture is reproduced on the screen of the color television picture tube.

As mentioned before, transistor 80 is normally in collector-emitter current saturation. In this condition, its collector-emitter impedance is very low—on the order of a couple of ohms. Therefore, it effectively appears that terminal 72 is connected to the positive terminal of battery 89, which has substantially zero impedance for signal current. Resistor 71 is, consequently, parallelled by a complete signal bypass and, for signal purposes, cathodes 55, 58, and 61 may be considered as being grounded. Under these conditions, no cathode matrixing occurs since there is no effective common impedance at signal frequencies for the color difference amplifiers.

During horizontal retrace intervals, it is desirable to perform an operation on the color television picture tube which is known as horizontal retrace blanking. At the same time, it is desirable to provide key clamping in the color difference amplifiers. As shown, winding 87 coupled to horizontal output transformer 86 supplies a positive pulse through capacitor 85 to base 82 of transistor 80 during each horizontal retrace interval. Due to the slight ringing which normaly occurs in the horizontal output transformer, the positive pulses provided by winding 87 are "ragged" as pictorially shown. The presence of a positive pulse on base 82 reduces the forward bias on transistor 80 thus driving it out of saturation into cutoff and effectively removing the +V voltage from terminal 72. As shown, this results in a negative pulse at terminal 72.

The negative pulses appearing on common terminal 72 appear on cathodes 55, 58, and 61, and are thus amplified in tubes 50, 51, and 52. The large negative pulses which result on anodes 53, 56, and 59 are capacitively coupled to the red, green, and blue grids of the picture tube, thereby cutting off the flow of electrons from the cathodes of the picture tube. In this manner, horizontal retrace blanking is effectively and efficiently accomplished.

At the same time, the presence of these sharp, square, negative pulses on common terminal 72 create a nearly ideal condition for key clamping in the color difference amplifiers. As each negative pulse arrives on common terminal 72, the respective cathodes 55, 58, and 61 of tubes 50, 51, and 52 swing sharply negative with respect to the DC voltage at control electrodes 54, 57, and 60, which is due to the charge on capacitors 44, 45, and 46. This drives tubes 50 and 52 conductive via their grid-cathode circuits.

As a result, a charging path with a relatively small RC time constant is provided for each of the capacitors 44, 45, and 46. This charging path for capacitor 46, for example, is the series path from B+ potential through resistor 33, inductor 37, capacitor 46, the forward biased grid-cathode diode of tube 52, and resistor 71 to ground reference potential. Similar paths exist for capacitors 45 and 46, and the small time constants are due to the relatively low values of resistors 32, 33, 39, 42, and 71. Thus, during each horizontal retrace interval, relatively large amounts of cathode-grid currents flow and capacitors 44, 45, and 46 are charged up to voltages which are negative with respect to the cathodes. As the negative pulse on common terminal 72 disappears, the negative charge on the capacitors begins to leak off. However, this leakage takes place very slowly because the large value of resistors 47, 48, and 49 provide relatively large RC time constants for the discharge paths.

As is well-known, key clamping provides automatically for adjustment of the relative DC voltages on control electrodes 54, 57, and 60 when the aging characteristics of tubes 50, 51, and 52 differ because the amount of grid-cathode current flow in each tube is directly proportional to the available cathode emission. The sharp, square, negative pulses developed by the transistorized blanking circuit provide nearly ideal conditions for accomplishing this key clamping as the cathodes of the color difference amplifiers are maintained at substantially ground reference potential throughout the horizontal retrace interval so that an even flow of cathode-grid current is produced for charging the capacitor in the grid circuit.

It will be seen that triodes 50 and 52 may be readily replaced with transistors (providing precautions are taken to prevent harmful fortuitous arcing in the picture tube from reaching them). Since transistors do not present serious aging problems, the necessity of key clamping will, of course, be minimized although the blanking function will still be extremely desirable and the ability to demodulate for $R-Y$ and $B-Y$ directly will be of substantial benefit.

From the preceding description, it will be appreciated that the transistor blanking circuit of this invention provides an inexpensive, efficient horizontal retrace blanking function for the color picture tube and a nearly ideal key clamping function for the color difference amplifiers coupled with a simple demodulator producing $R-Y$ and $B-Y$. It is to be understood that the above description of a preferred embodiment of this invention is given by way of example only and that numerous modifications may be made without departing from the scope of this invention as claimed in the following claims.

The embodiments of the invention in which an exclusive property or privilege is claimed are defined as follows:

1. In a color television receiver including: scansion means having trace periods and retrace periods, means deriving two of three desired color difference signals from a modulated matrixed combination of color difference signals; three color difference amplifiers each including a common input resistance and an output; means applying said two color difference signals to the inputs of two of said color difference amplifiers, respectively; matrix means supplying a portion of the signal output of each of said two color difference amplifiers to the input of the third color difference amplifier; and transistor means having an input responsive to said scansion means and an output, connected across said common input resistance; and operating means maintaining said transistor in output current saturation thus establishing a first DC potential level at said common input resistance during said trace periods of said scansion means and a second DC level during said retrace periods whereby said inputs are driven into heavy conduction during said retrace periods.

2. In a color television receiver as set forth in claim 1 wherein said input circuits each have one electrode commonly connected and wherein said transistor output circuit impedance is substantially zero with respect to said common resistance during output current saturation of said transistor.

3. In a color television receiver as set forth in claim 1 wherein said color difference amplifiers each include an anode, a cathode and a control grid and wherein said desired color difference signals correspond to a $R-Y$, a $B-Y$ and a $G-Y$ signal; said cathodes being connected together and to said common input circuit resistance, whereby said color difference amplifiers are driven into heavy grid-cathode conduction during said retrace periods.

4. In a color television receiver as set forth in claim 3 wherein said transistor is of the PNP type having its collector and emitter electrodes forming said output circuit and its base and emitter electrodes forming said input circuit; and wherein said operating means include a positive source of DC voltage serially connected with a resistor and coupled across said input circuit.

5. In a color television receiver of the type including a demodulator for producing a $R-Y$ and a $B-Y$ color difference signal, three color difference amplifiers, means coupling the output of said demodulator to two of said three color difference amplifiers, feedback means coupled to the output of said two color difference amplifiers for deriving a $G-Y$ color difference signal and applying it to said third color difference amplifier, and blanking means coupled to an impedance common to said color difference amplifiers for providing blanking pulses in the outputs thereof during retrace periods and for driving the input circuits of said color difference amplifiers heavily conductive for resetting the input bias circuits thereof, the improvement in said blanking means comprising; a transistor having an output circuit connected across the common impedance in said blanking means, said transistor being coupled to a source of low DC potential and normally being in saturation during trace periods so that said common impedance is shunted by the low saturation resistance of said transistor; and means applying a pulse to the input circuit of said transistor during retrace periods for driving said transistor out of saturation into cutoff whereby the DC potential drop across said common impedance is reduced substantially and said color difference amplifiers are driven heavily conductive.

References Cited

UNITED STATES PATENTS

| | | | |
|---|---|---|---|
| 2,901,534 | 8/1959 | Oakley | 178—5.4 |
| 2,935,556 | 5/1960 | Barco | 178—5.4 |
| 3,446,915 | 5/1969 | Voige | 178—7.5 |

RICHARD MURRAY, Primary Examiner

R. L. RICHARDSON, Assistant Examiner